United States Patent
Weber

(10) Patent No.: US 9,921,061 B2
(45) Date of Patent: Mar. 20, 2018

(54) METHOD FOR OPERATING A CONSTRUCTION LASER

(71) Applicant: STABILA Messgeräte Gustav Ullrich GmbH, Annweiler (DE)

(72) Inventor: Andreas Weber, Wilgartswiesen (DE)

(73) Assignee: STABILA MESSGERÄTE GUSTAV ULLRICH GMBH, Annweiler (DE)

( * ) Notice: Subject to any disclaimer, the term of this patent is extended or adjusted under 35 U.S.C. 154(b) by 101 days.

(21) Appl. No.: 15/159,994

(22) Filed: May 20, 2016

(65) Prior Publication Data

US 2017/0336204 A1 Nov. 23, 2017

(30) Foreign Application Priority Data

May 21, 2015 (DE) .................. 10 2015 108 084

(51) Int. Cl.
*G01C 15/02* (2006.01)
*G01C 15/00* (2006.01)
*G08C 17/02* (2006.01)

(52) U.S. Cl.
CPC ......... *G01C 15/004* (2013.01); *G01C 15/008* (2013.01); *G08C 17/02* (2013.01)

(58) Field of Classification Search
CPC ... G01C 15/004; G01C 15/006; G01C 15/008
(Continued)

(56) References Cited

U.S. PATENT DOCUMENTS 6,166,802 A * 12/2000 Kodaira ............... G01C 15/006
33/293
7,441,339 B2 * 10/2008 Kallabis ................ F16M 11/32
33/286
(Continued)

FOREIGN PATENT DOCUMENTS

DE    10 2010 011 473 A1    9/2011
DE    10 2012 112 834 A1    6/2014
(Continued)

OTHER PUBLICATIONS

Non-English German Examination Report dated Feb. 15, 2016 for German Application No. 10 2015 108 084.2.
(Continued)

*Primary Examiner* — G. Bradley Bennett
(74) *Attorney, Agent, or Firm* — Ladas & Parry LLP

(57) ABSTRACT

A method for operating a construction laser by means of a remote controller, which has an input field, for initiating an action of the construction laser, wherein the remote control unit contains a sensor for determining a change in a parameter of the remote control unit, and the change in the parameter influences the at least one action, wherein the parameter is a parameter from the group comprising position, tilt, and movement of the remote control unit, and the action is an action or one operating mode from the group comprising rotational speed of the laser head, cross-sectional mode, mask mode, scan mode, tilt of the plane spanned by the particularly rotating laser beam, and point mode. To enable easy handling, following activation of the input field, the action is initiated only when the degree of change in the parameter of the remote control unit has reached a threshold value.

13 Claims, 11 Drawing Sheets

Figure 1:
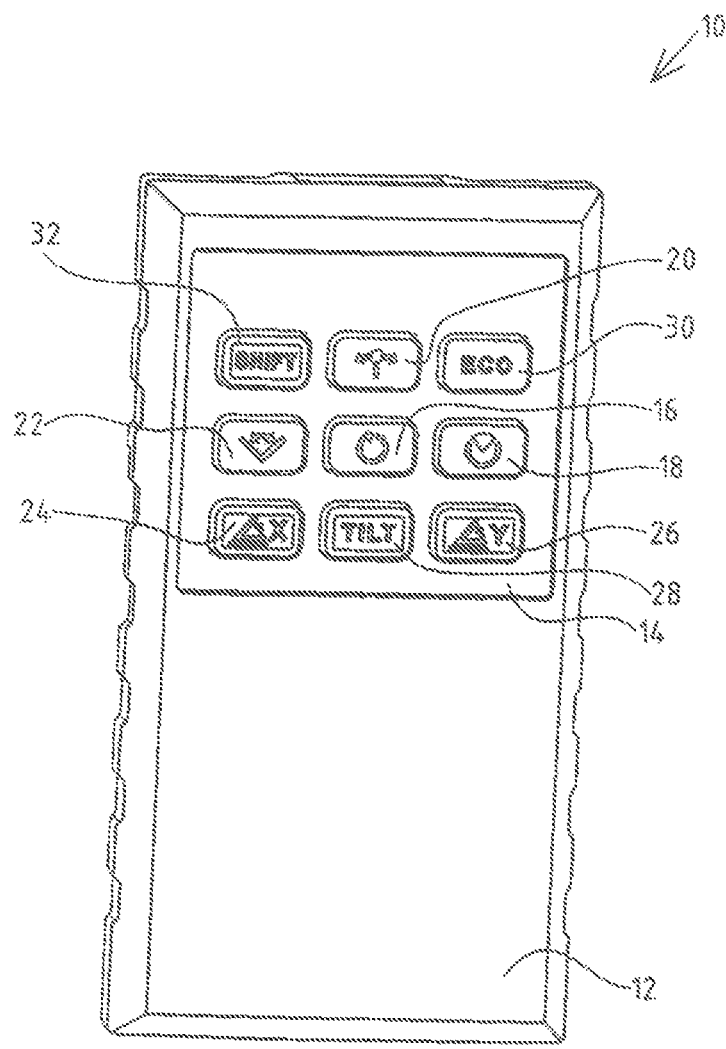

(58) Field of Classification Search
 USPC .......................................... 33/228, 290, 291
 See application file for complete search history.

(56) References Cited

U.S. PATENT DOCUMENTS

| | | | |
|---|---|---|---|
| 2004/0218104 A1 | 11/2004 | Smith et al. | |
| 2009/0097011 A1* | 4/2009 | Henschel | G01C 3/02 356/4.01 |
| 2011/0235053 A1* | 9/2011 | Campagna | G01C 15/004 356/614 |
| 2011/0266425 A1* | 11/2011 | Kallabis | G01C 15/006 250/239 |
| 2012/0203502 A1* | 8/2012 | Hayes | G01C 15/002 702/155 |
| 2014/0173921 A1 | 6/2014 | Gros et al. | |
| 2014/0190025 A1* | 7/2014 | Giger | G01C 15/002 33/228 |
| 2015/0092183 A1* | 4/2015 | Dumoulin | G01C 15/004 356/4.07 |
| 2015/0160009 A1* | 6/2015 | Bank | G01C 15/06 33/228 |
| 2016/0202056 A1* | 7/2016 | Senger | G01C 3/08 356/3 |
| 2017/0284790 A1* | 10/2017 | Khatuntsev | G01B 11/002 |

FOREIGN PATENT DOCUMENTS

| | | |
|---|---|---|
| JP | 2004-108939 A | 4/2004 |
| JP | 2013-156124 A | 8/2013 |
| WO | 2011/041884 A1 | 4/2011 |
| WO | 2013/020845 A1 | 2/2013 |

OTHER PUBLICATIONS

Hein, "Lernende Klassifikation beschleunigungsbasierter 3D-Gesten des Wii-Controllers"; Projektbericht an der Fachhochschule Köln bei Prof. Dr. Konen, Nov. 2009.
Espacenet English abstract of WO 2013/020845 A1.
Espacenet English abstract of JP 2004-108939 A.
European Search Report dated Oct. 10, 2016 for Application No. EP 16 17 0410.
Espacenet English abstract of DE 10 2010 011 473 A1.

* cited by examiner

METHOD FOR OPERATING A CONSTRUCTION LASER

The invention relates to a method for operating a construction laser, such as a rotating laser or linear laser having a laser head, by means of a remote control unit, which has at least one input field, such as a button, for initiating at least one action of the construction laser, wherein the remote control unit comprises at least one sensor for detecting a change in a parameter of the remote control unit, and the change in the parameter at least influences the at least one action, and wherein the parameter is a parameter from the group comprising position, tilt, and movement of the remote control unit, and the action is at least one action or one operating mode from the group comprising rotational speed of the laser head, cross-sectional mode, mask mode, scan mode, tilt of the plane spanned by the particularly rotating laser beam, and point mode.

A rotating laser is an instrument that is used to determine or check particularly horizontal height profiles, lines and plumb points. A rotating laser beam which forms a reference plane is used for this purpose. The laser beam may generate a visible reflection on the points to be measured, or may be detected by means of a receiving unit. Ordinarily, a corresponding rotating laser is set up in a reference location, after which the desired operating mode is implemented. This may include, for example establishing a reference line, which is formed by the plane spanned by the rotating laser beam by imaging on boundary surfaces, a scan mode, in which the laser beam is moved back and forth over a desired angular region, a cross-sectional mode, in which laser radiation is detectable only over a predefined angular region while the laser head is rotating, a point mode, in which, with the laser head stationary, a laser point is imaged in a desired direction on a boundary, the capability of orienting the radiation emitted by the rotating laser head and the line generated thereby in relation to horizontal or vertical within a desired angle.

Ordinarily, adjustment to the desired mode—also called an action—is performed on the instrument itself, which entails the disadvantage that the instrument may unintentionally be shifted. In addition, frequently the user is not located in the immediate vicinity of the rotating laser, thus the user is required to move back and forth between his actual location and that of the rotating laser.

To avoid these disadvantages, laser instruments having remote control units that can be used to adjust to a desired operating mode are known. However, these control units are complicated to operate and do not offer the desired level of convenience.

DE 10 2012 112 834 A1 discloses a system consisting of rotating laser and remote control unit. The object of the remote control unit is to provide protection against theft, since the rotating laser can be operated only by using the remote control unit. The rotating laser further has an acceleration sensor for detecting any acceleration of the rotating laser, allowing unauthorized removal to be identified. In addition, in order to operate the laser, it is necessary in principle for the control field to be optically detected.

To improve functionality in terms of changing the orientation of a rotating laser, according to WO 2013/020845 A1 a remote control unit is used, in which the degree of orientation or the speed of changes in the orientation of said remote control unit are scaled to the degree of orientation or speed of the surveying instrument. This is intended to enable a coarse orientation and thereafter a fine orientation toward a target.

JP 2013-156 124 A and JP 2004-108 939 A relate to remote control units of measuring instruments.

It is the object of the present invention to further enhance a method of the type described in the introductory portion so as to enable intuitive operation. It is a further object to ensure, at the same time, that movements in the remote control unit are selectively, that is to say not unintentionally, transferred to the construction laser, such as a rotating laser, or the control device thereof, thereby preventing malfunctions.

To attain this object, the invention provides essentially that, after the at least one input field has been activated, the at least one action is initiated only when the degree of change in the at least one parameter of the remote control unit at least reaches a threshold value.

According to the invention, activating a control field, which is particularly a button but may also be an area of a touchscreen, allows a desired action to be selected. However, the action is not implemented immediately simply by activating the control field, but only after the remote control unit—hereinafter shortened to remote controller—is intentionally moved while activation of the control field is deliberately continued. In this process, a deliberate movement is produced particularly by turning the hand that is holding the remote controller, with the remote controller or the housing thereof preferably being turned around its longitudinal axis.

In addition, to avoid unintentionally initiating the action, the position of the remote controller must be deliberately changed—if the remote controller is hand-held, rotated around its axis—to such a degree that a threshold value, which is dependent on the degree, that is to say the extent of the rotation and is determined by at least one sensor, in particular a tilt sensor, is reached. With a further change in the parameter to be measured, which is determined by the sensor, that is to say, e.g., the rotation and thus the tilt of the remote controller, in particular in relation to horizontal, signals that are transmitted by the remote controller to the laser instrument controller are then used to determine the degree of the action, and once a desired value has been reached, the control field is no longer activated, and therefore the achieved value is maintained.

Depending on the change in direction of the parameter, e.g. the rotation of the remote controller clockwise or counterclockwise, e.g. with the "speed adjustment" action, the rotational speed is increased or decreased from the rotational speed of the laser head at the time the instrument is switched on. The operating mode of the laser instrument can thus be adjusted intuitively in a simple manner and an uncontrolled change can be prevented. Once the desired value has been reached and the control field released, the remote controller can be placed in a pocket, for example, without the degree of the action, in the case of the "speed adjustment" action the rotational speed, changing.

In other words, the invention is particularly characterized in that, once the desired degree of the action is reached, the input field is no longer activated, and the degree of the action initiated by the degree of the change in the parameter is maintained, in particular the rotational speed of the laser head.

Corresponding measures also apply to other operating modes, wherein according to a further development of the invention, initiating an action is dependent on at least one additional previous action, and the threshold value for each action must be reached separately.

For instance, to initiate the scan mode by activating a control field assigned to said mode, an action may be carried out prior to this, by means of which a laser beam that is perceived outside of the rotating laser is emitted over an angle that is dependent on the degree of change in the parameter.

In particular, it is provided that by activating a control field assigned to the rotational speed of the laser head action and reaching the threshold value, the speed of the rotating laser head is changed dependent upon the degree of change in the parameter once the threshold value has been reached.

To initiate the point mode, first the action that determines the speed of the laser head is carried out, in which, with the laser head stationary, the control field assigned to the point mode is activated, and once the threshold value is reached, the position of the rotating head is changed dependent upon the degree of change in the parameter.

If a cross-sectional mode is desired, in which emitted light that is perceivable from outside the rotating laser masks an angular region, a control field assigned to the cross-sectional mode is activated, and once the threshold value is reached, the degree, that is to say the size of the angle, of the masked region is changed dependent upon the degree of change in the parameter.

The invention is also characterized particularly in that, once an action has been initiated and the control field assigned to the action has been reactivated, the degree of the action is changed immediately if the remote control unit is already in a position in which the parameter has exceeded the threshold value.

In particular, it is provided that, as the starting point for both the scan mode and the cross-sectional mode, and also for the point mode, a region of the laser that lies opposite the control field is always selected, and the scanning region or the cross-sectional mode or the position of the reference point is changed proceeding from said regions. Other reference points may, of course, also be selected.

The quasi-zero position of the remote controller, from which the change in the parameter is determined by means of the at least one sensor, is particularly the orientation of the remote controller toward the laser instrument. However, other reference points are also possible.

It is particularly advantageous that, according to the teaching of the invention, fewer command buttons are required than with other remote controllers that are used for construction lasers, since the tilt or the type of tilt replaces command buttons that are otherwise necessary.

In particular, the invention is characterized by a method for operating a construction laser, such as a rotating or linear laser, by means of a remote controller that has at least one input field, such as a button, for initiating at least one action of the construction laser, wherein the remote control unit contains at least one sensor for identifying a change in a parameter of the remote control unit, and the change in the parameter at least influences the at least one action, wherein the parameter is a parameter from the group comprising the position, tilt, and movement of the remote control unit and the action is at least one action or one operating mode from the group comprising rotational speed of the laser head, cross-sectional mode, mask mode, scan mode, tilt of the plane spanned by the particularly rotating laser beam, and point mode, the method being characterized in that, following activation of the at least one input field, and while the input field remains activated, the at least one action is initiated only when the degree of change in the at least one parameter of the remote control unit has at least reached a threshold value, in that once the threshold value has been reached, the degree of the at least one action is changed dependent upon the degree of the change in the parameter that has taken place, and in that, once the desired degree of the action has been reached, the input field is no longer activated, and the degree of the action initiated by the degree of the change is maintained, in particular the rotational speed of the laser head.

Regarding the threshold value, it should be noted that this is intended to be an absolute value, with the threshold value being determined particularly by the tilt of the plane that is spanned by the remote control unit or the housing thereof in relation to the earth's gravitational field, and with the starting point being the horizontal orientation of the plane, that is to say the plane in the horizontal plane or approximately the horizontal plane itself. In this case, a tilt angle of e.g. 5° to 10° from horizontal may be selected.

Regarding the sensor or sensors to be integrated into the remote controller, it should be noted that acceleration sensors based on various measurement principles, e.g. piezoresistive, piezoelectric, capacitive, magnetoresistive, or thermodynamic sensors, or sensors based on the Hall effect may be used. Preferably, the sensor or sensors is/are preferably embodied as MEMS (microelectromechanical systems). Position and tilt sensors, e.g. electronic levels or other liquid sensors and tilt switches may also be used.

Additional details, advantages and features of the invention result not only from the claims, the features found therein—alone and/or in combination—but also from the following description of a preferred embodiment example illustrated in the set of drawings.

Figure 2:
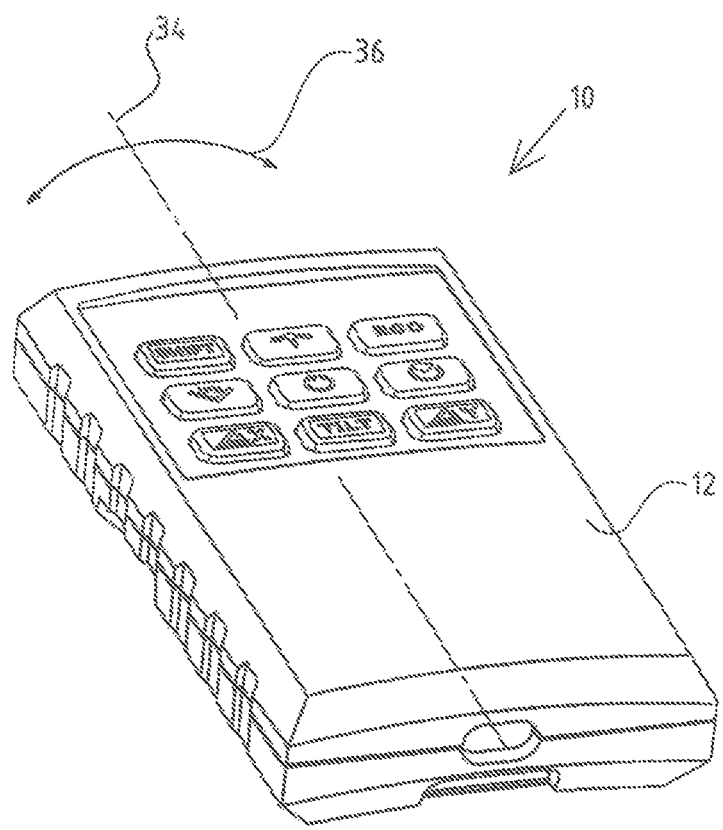
Figure 3:
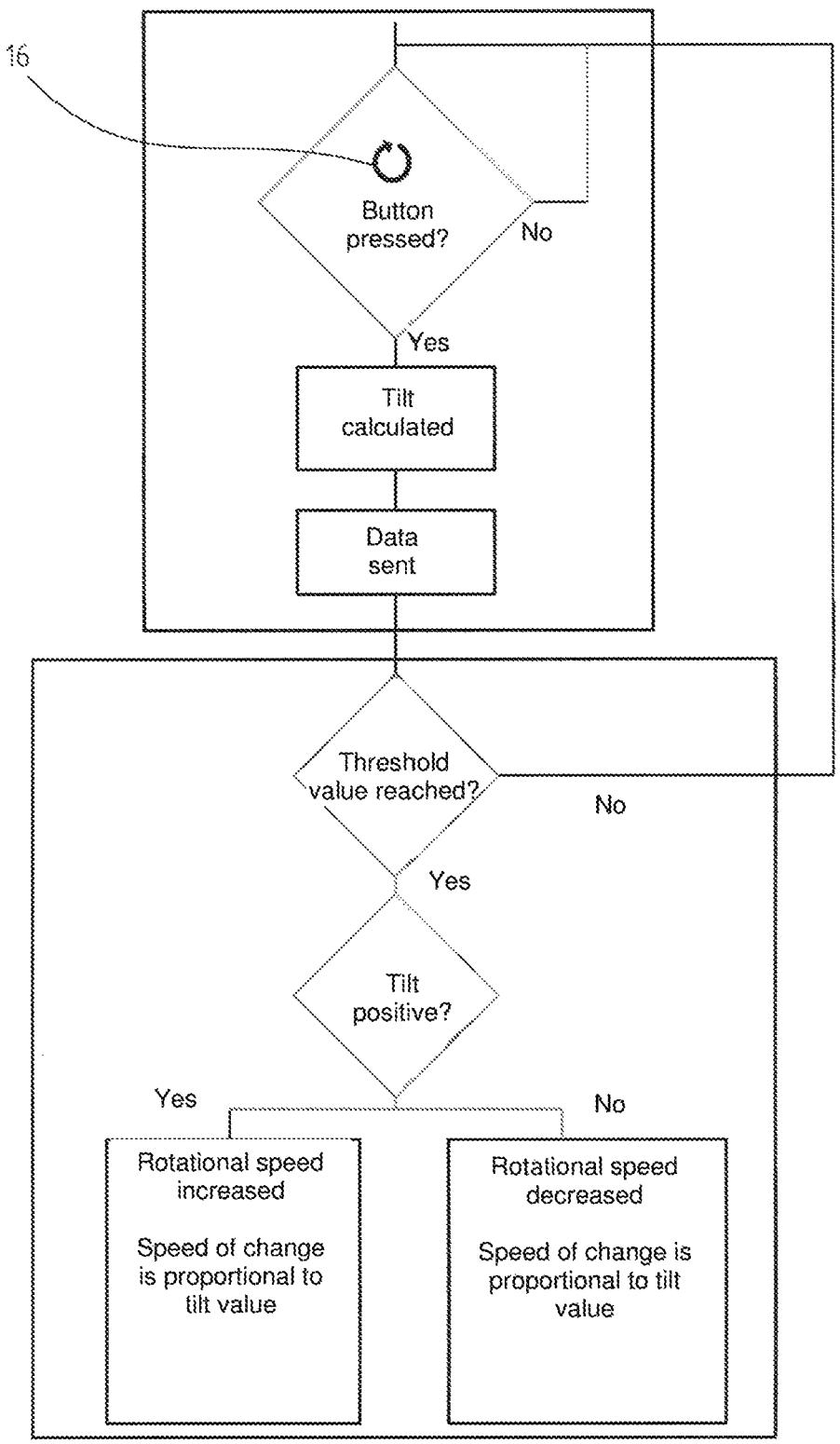
Figure 4:
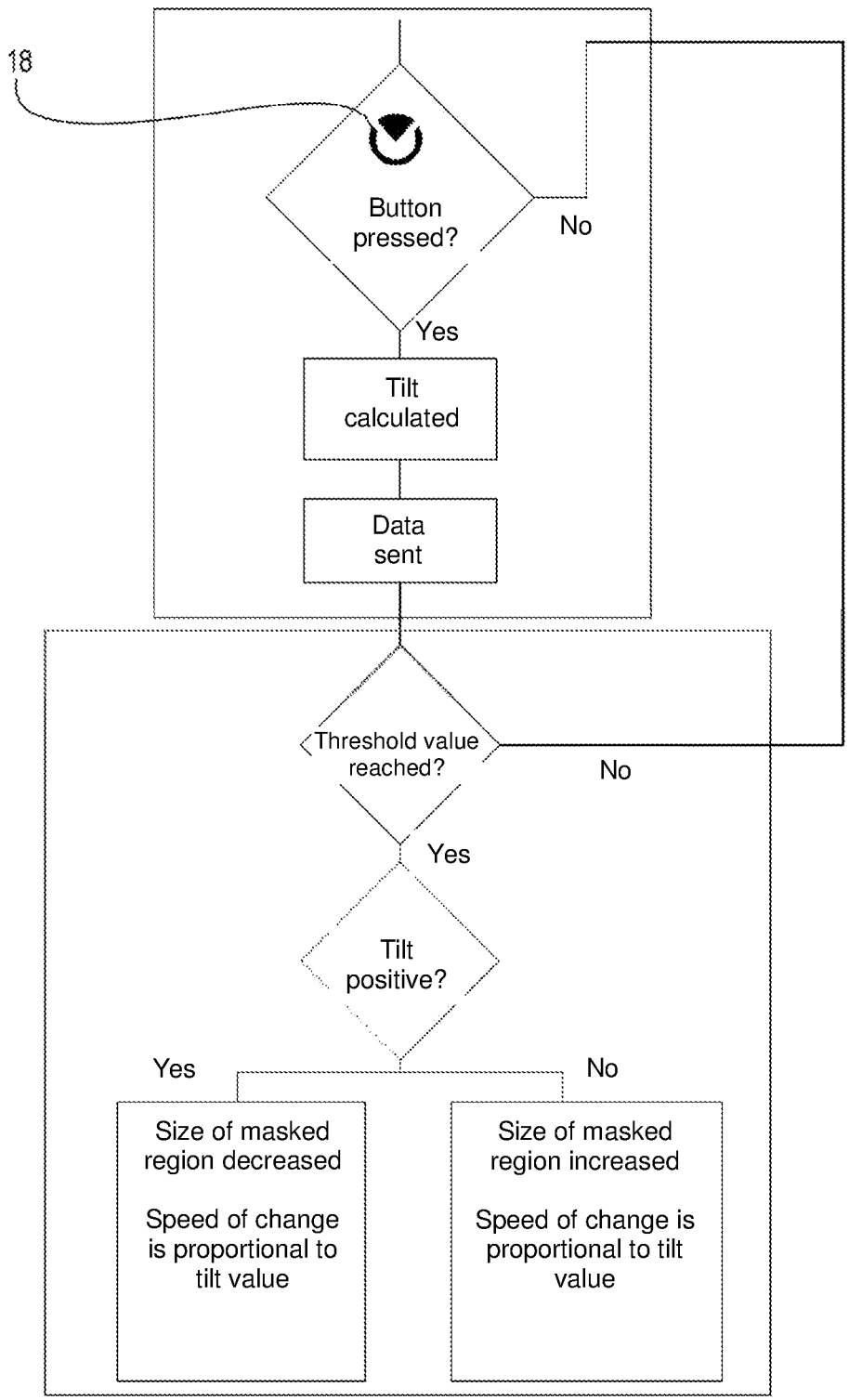
Figure 5:
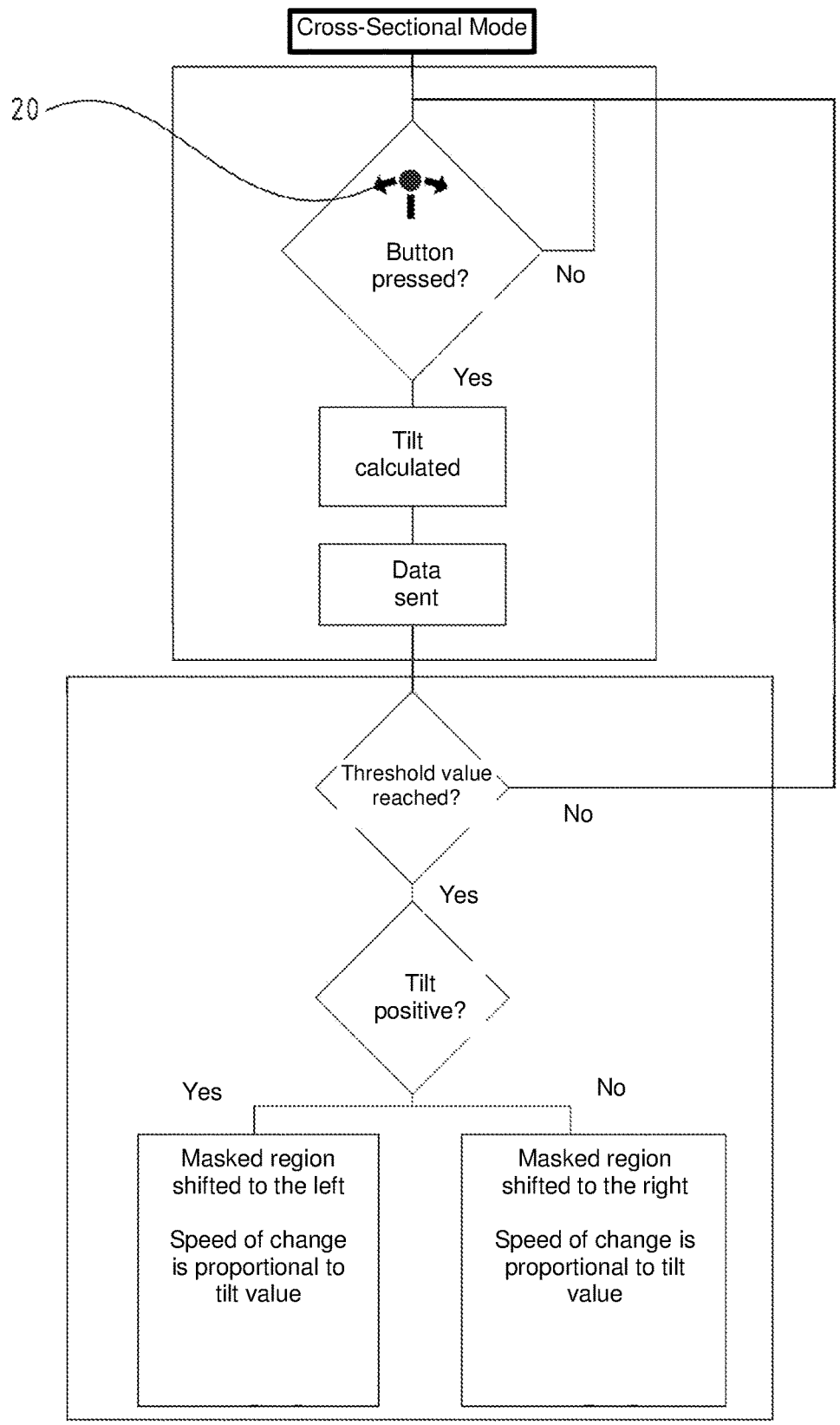
Figure 6:
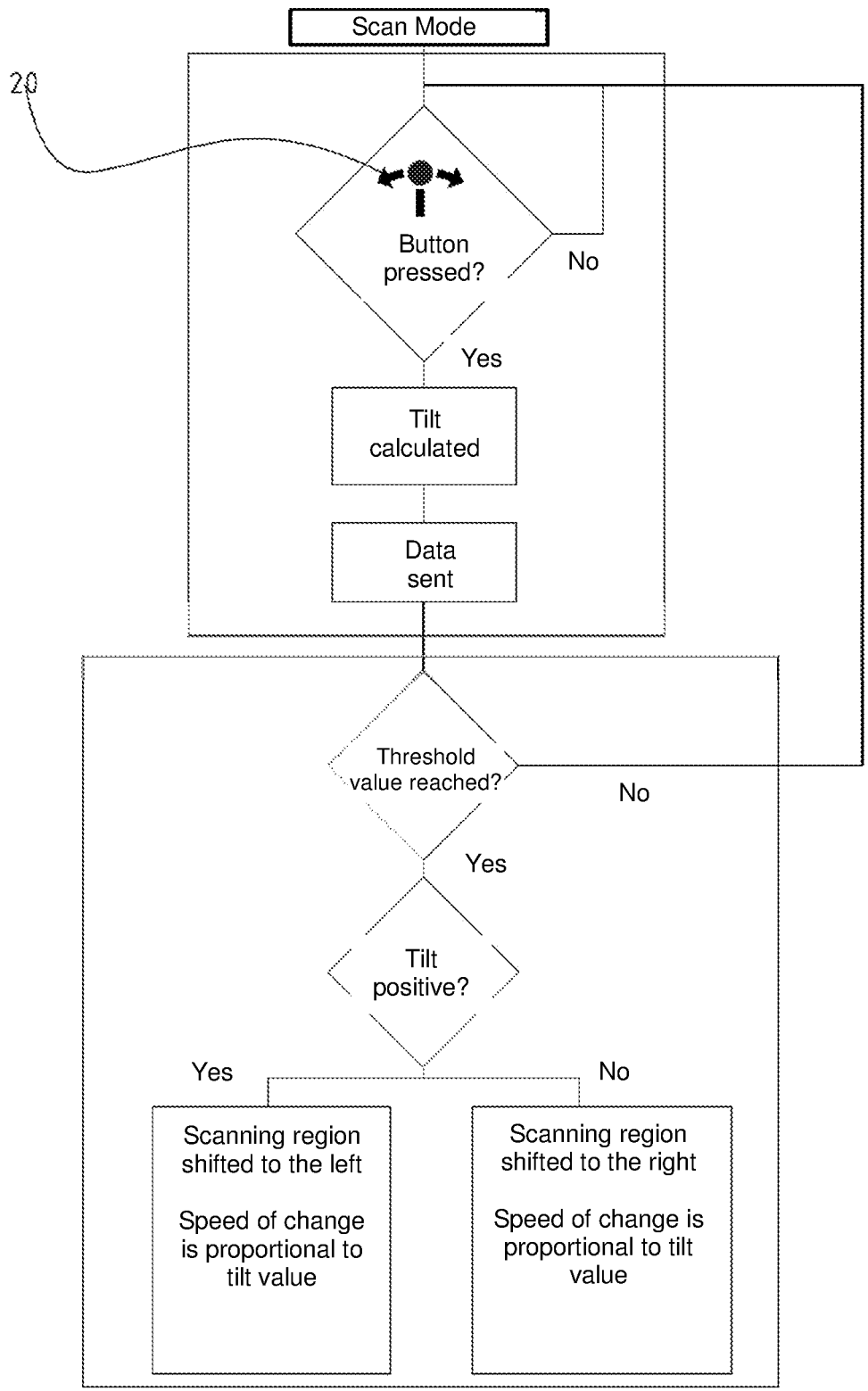
Figure 7:
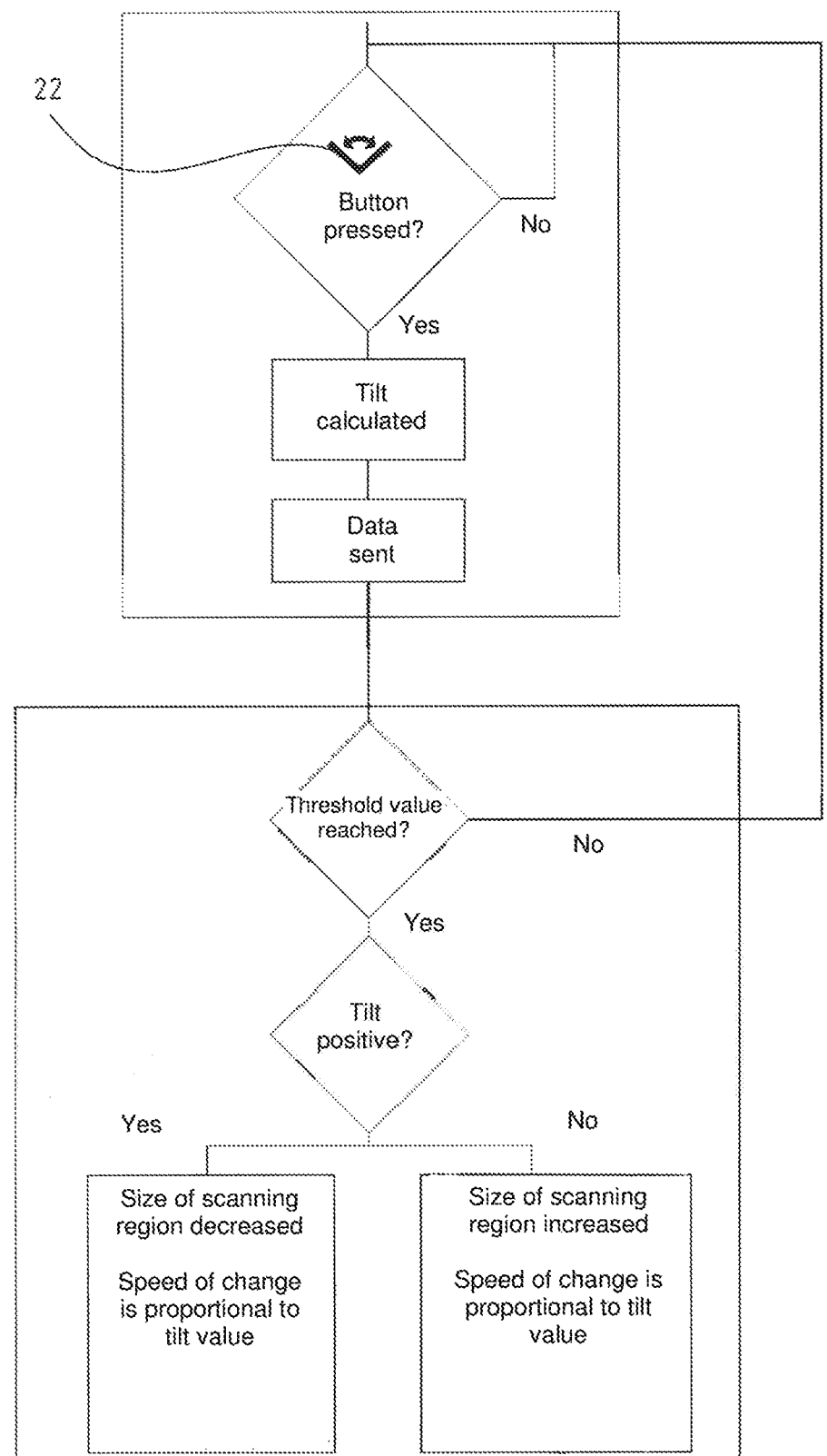
Figure 8:
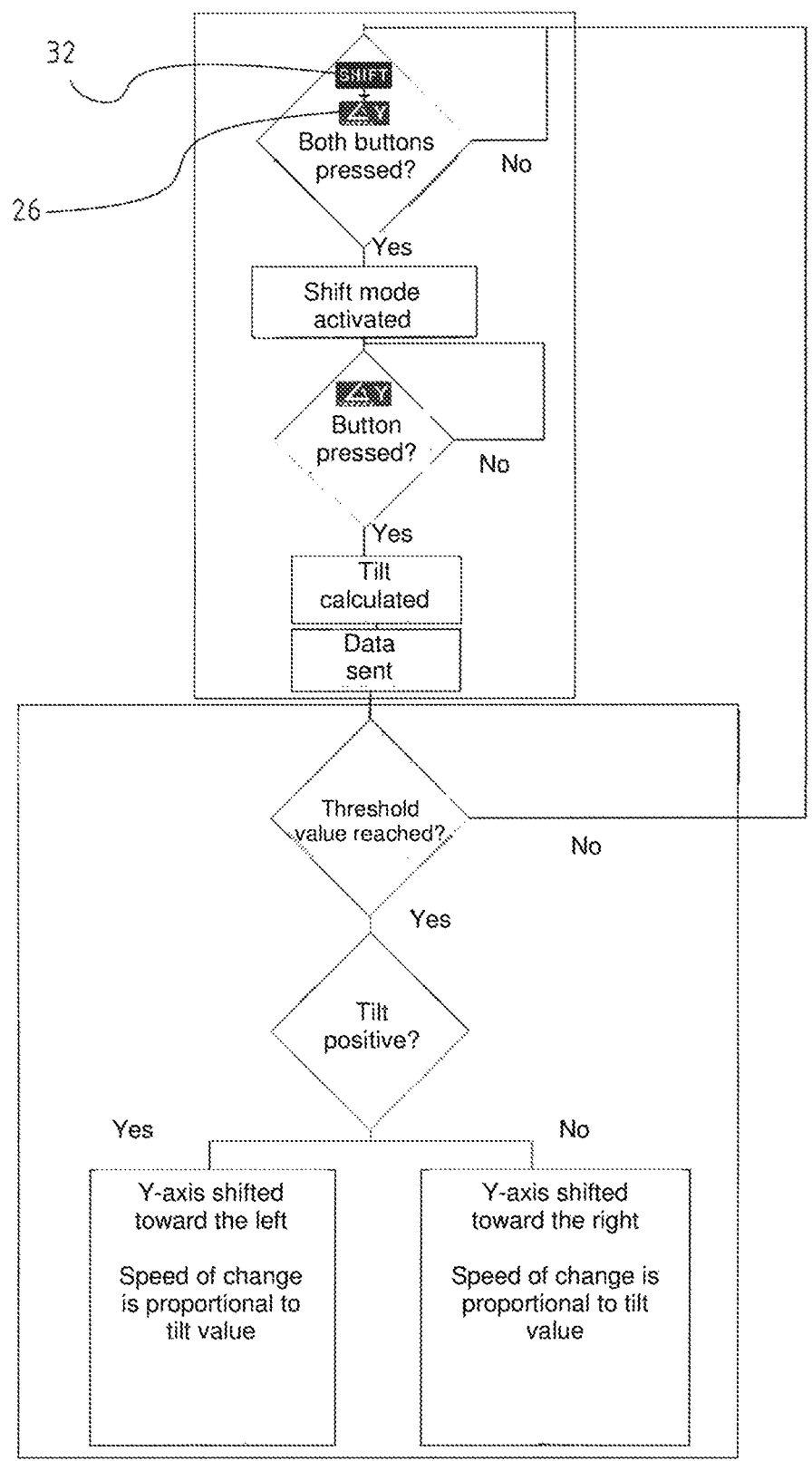
Figure 9:
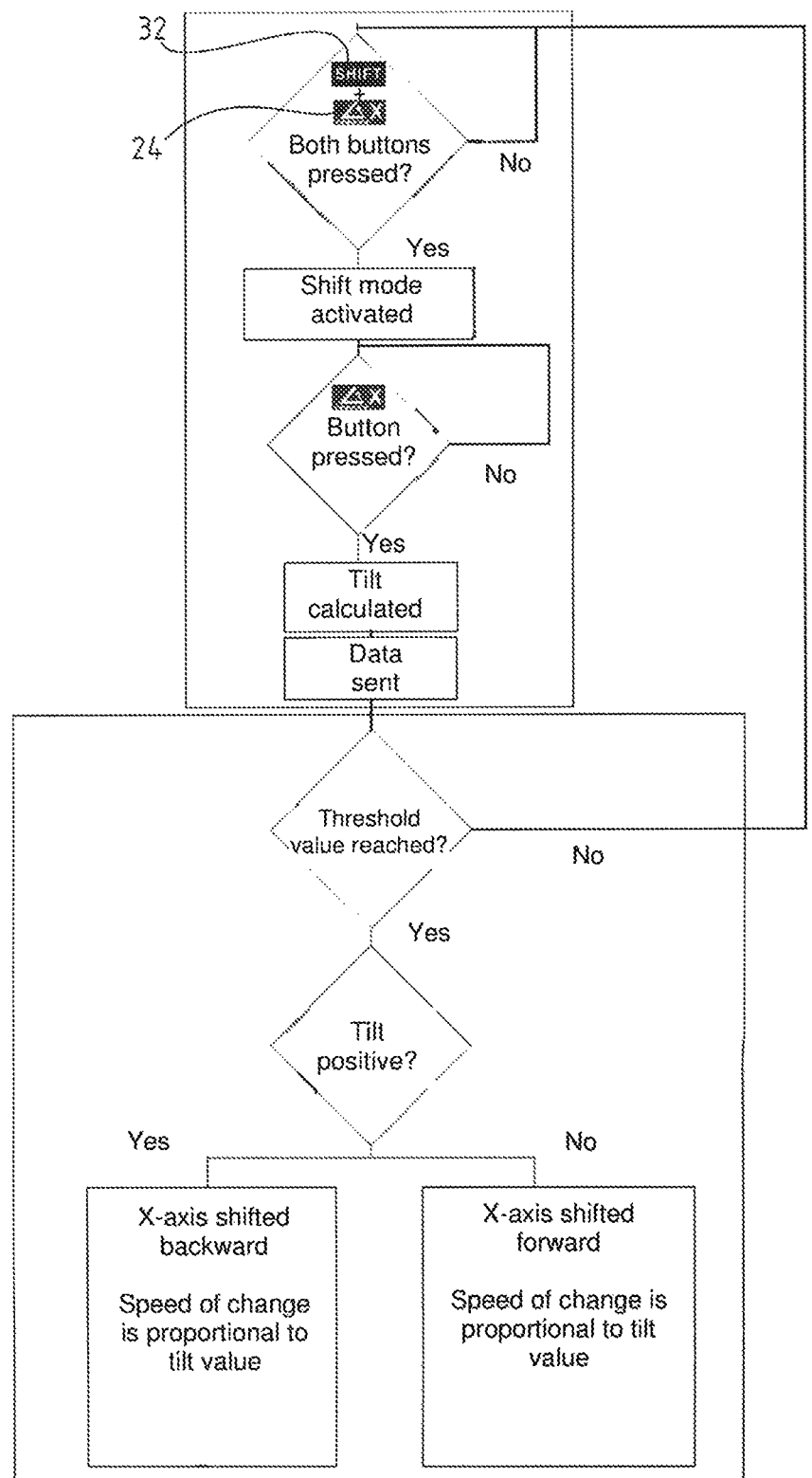
Figure 10:
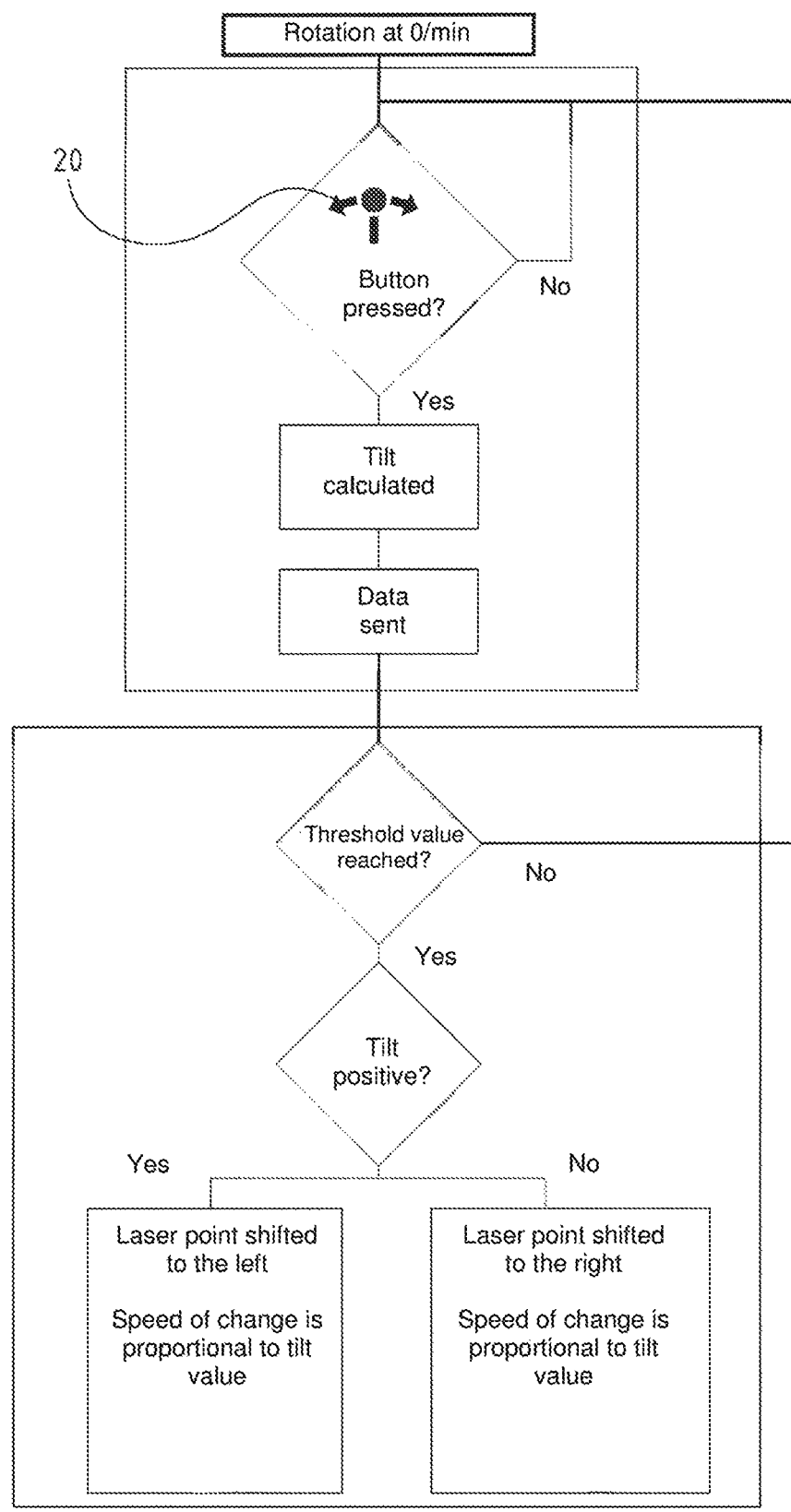
Figure 11:
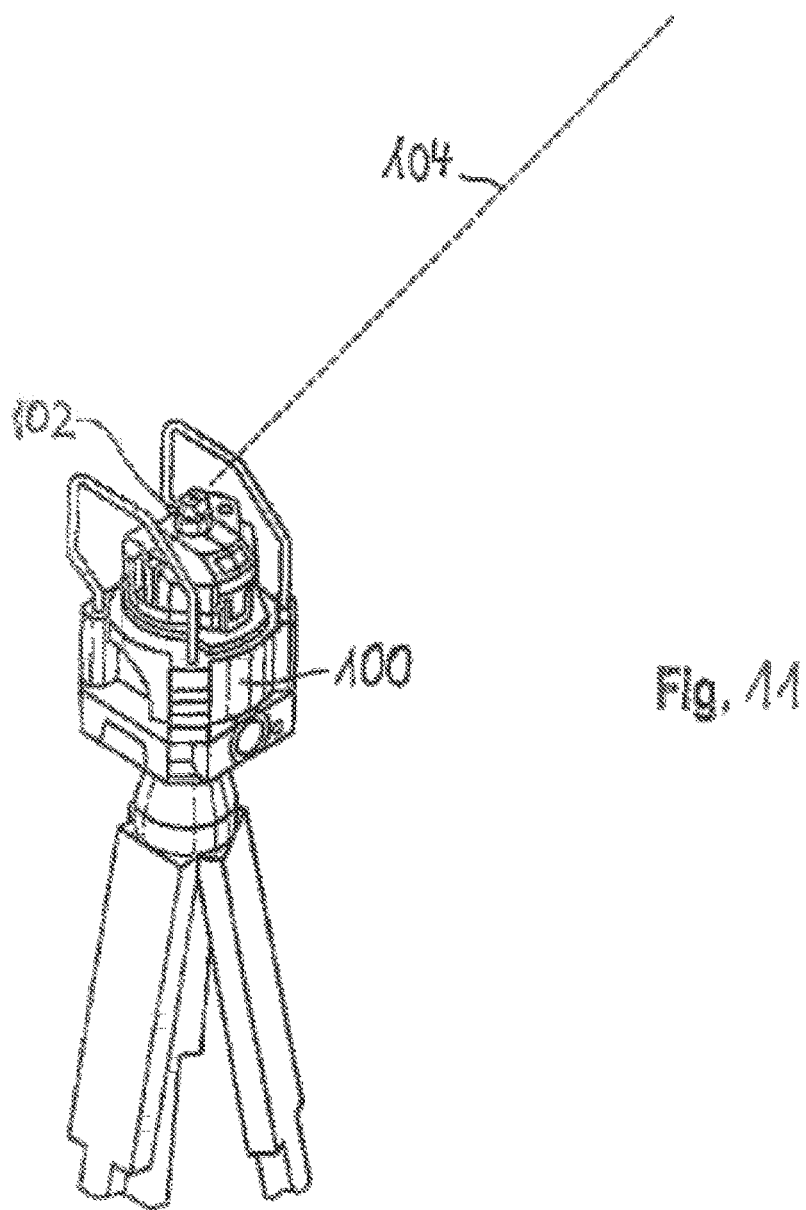

The drawings show:

FIG. 1 a plan view of a remote controller,

FIG. 2 a remote controller in the position of use,

FIG. 3 a flow chart illustrating the adjustment of the rotational speed of a laser head of a rotating laser, FIG. 4 a flow chart illustrating a mask mode, FIG. 5 a flow chart illustrating a cross-sectional mode, FIG. 6 flow chart illustrating a scan mode, FIG. 7 flow chart illustrating a scan mode, FIG. 8 flow chart illustrating the adjustment of the tilt angle of a rotating laser, FIG. 9 flow chart illustrating the adjustment of the tilt angle of a rotating laser, FIG. 10 a flow chart illustrating a point mode and FIG. 11 a rotating laser.

In reference to the figures, in which the same reference signs are used in principle to identify like elements, the teaching according to the invention for operating a rotating laser 100 will be explained. Of these figures, particularly FIGS. 3 to 10 are self-explanatory, and disclose the invention without more detailed description.

The rotating laser 100 illustrated purely in principle in FIG. 11 has a rotating laser head 102, from which a laser beam 104 is emitted. The design and configuration of such a rotating laser 100 corresponds to the prior art and requires no additional explanation.

Although the invention is specified in the context of a rotating laser, the teaching of the invention is not restricted to this. Rather, the teaching of the invention may be applied to any type of laser or construction laser, in particular linear and rotating lasers.

To operate rotating laser 100, a remote controller 10 is used, with which desired actions or operating modes of rotating laser 100 or of the laser or rotating head 102, which is rotatably disposed in rotating laser 100 and from which laser radiation 104 is emitted, are adjusted. Remote controller 10 has a housing 12 having a display 14, which may be embodied as a touchscreen and which has control fields in predefined regions. The touchscreen may be particularly a capacitive touchscreen, however the invention is not restricted to this.

It is also possible to use buttons in place of a touchscreen with control fields, with each button likewise performing the function of a control field. Other equivalent solutions for initiating actions are likewise possible, without thereby restricting the invention. Rather, solutions of this type are covered by the invention.

In the embodiment example, display 14 has nine control fields, which are identified by reference signs 16, 18, 20, 22, 24, 26, 28, 30, 32. Actions or operating modes of rotating laser 100 are initiated using control fields 16, 18, 20, 22, 24, 32. Buttons 28, 30 are not necessary as such for implementing the teaching of the invention, since these control functions that are independent of the tilt of the remote controller.

Remote controller 12 can be held by a user in a hand which is oriented in a natural position approximately horizontally, in order to then rotate remote controller 12 around its longitudinal axis 34 (arrow 36), wherein dependent on the rotation—also called the tilt—actions are initiated, as will be described in the following.

Housing 12 of remote controller 10 contains an electronic system for generating signals dependent on the actuation of one of the control fields and on the tilt of housing 12, and these signals are transmitted to rotating laser 100 in order to implement desired actions or operating modes. To determine the tilt of housing 12, at least one correspondingly suitable sensor, in particular an acceleration sensor, is located in the housing, and determines the direction of the gravitational force and therefore the horizontal and vertical change in angle. In this case, the sensor is particularly a microsystem (MEMS).

The use of a tilt sensor is preferred, since this type of sensor also enables pulsed operation. These advantages are not offered by a gyroscope.

Once rotating laser 100 has been adjusted and laser head 102 is rotating, e.g. the rotational speed can be adjusted via remote controller 10. To accomplish this, it is first necessary to press button 16. However, merely pressing the button does not initiate a change in rotational speed. Rather, housing 12 must be rotated until a threshold value, that is to say a defined swiveling of the housing, is achieved.

The threshold value should be an absolute value, in which the tilt, i.e. the rotation of housing 12 in relation to the earth's gravitational field, is taken into consideration. For instance, the threshold value can be reached, e.g. when housing 12 has been rotated in relation to horizontal e.g. by 5° or 10° to the earth's gravitational field about a longitudinal axis.

Once the threshold value is reached, a determination is made via the tilt sensor, according to FIG. 3, as to whether housing 12 is rotated, that is to say tilted, clockwise or counterclockwise. If it is determined that the tilt is positive, which corresponds e.g. to a rotation in a clockwise direction, the rotational speed is increased, with the speed of the change being proportional to the determined tilt value, as illustrated in FIG. 3.

If, in contrast, housing 12 has been rotated counterclockwise, the original rotational speed of laser head 102 is decreased, with the speed of the change again being proportional to the tilt value. These measures can even be used to bring the rotating laser head to a stationary position, which is a prerequisite for implementing the point mode, as will be described below. When the desired speed value is reached, button 16 is released. This serves to ensure that the set value is maintained.

FIG. 5 contains a flow chart showing the option of implementing a cross-sectional mode. Cross-sectional mode means that a region of the rotating laser light is masked, so that only light that is emitted over a desired angular region is perceptible. For this purpose, two buttons must be activated in succession, specifically first button 18, and once the operating mode defined by button 18 has been achieved, button 20, wherein in each case first the threshold value must be reached, so that the degree of the action is changed dependent upon the change in the parameter once the threshold value has been reached. In other words, the action can be initiated or changed only after the threshold value has been reached—specifically independently of how the parameter is changed.

By pressing button 18, the angular region in which the beam emitted by the still rotating laser head 102 is detected is defined. This region is referred to as the masked region. When the threshold value is reached while the button is being pressed, and thus housing 12 is tilted to the necessary degree, a determination is made by means of the tilt sensor as to whether the tilt is positive or negative. If a positive tilt is detected, the size of the masked region will be decreased, and if a negative tilt is detected it will be increased, with the region being changed dependent upon the tilt angle of the region that is actually present or will be occupied, specifically proportionally to the tilt angle. The degree of the tilt angle is implemented proportionally in the angular region. Once the desired angular region is adjusted, button 20 is pressed. Since the angular region extends in the region up to a reference point defined, e.g. by the manufacturer, which can lie, e.g. opposite the control field of the rotating laser, it must be possible for the masked region to be shifted. To accomplish this, button 20 is pressed, and when the tilt that is required to initiate the action has been established, that is to say the threshold value has been reached in the manner described above, a determination is made as to whether the tilt is positive or negative. Depending upon the nature of the tilt, the masked region is then shifted toward the left or the right, with the speed of the change being proportional to the tilt angle. This is self-explanatory—as with the other figures—in FIG. 5.

To initiate a scanning function, in which the laser beam is moved back and forth within a predefined angular region, button 22 must first be pressed according to the embodiment example. With button 22 held down, remote controller 10 is tilted to the necessary extent in order to reach the threshold value. A check is then made—as with the other functions—to determine whether a positive or negative tilt is present, so as to increase or decrease the size of the angular region within which the laser beam is moved back and forth, as is self-explanatory in FIG. 7. Once the desired angular region is reached, button 22 is released and then button 20 is pressed. In accordance with the statements relating to FIG. 5, once the threshold value has been exceeded and the tilt angle determined, that is to say the degree of tilt, the scanning region is shifted toward the left or right proceeding from a starting position.

FIG. 10 is a flow chart indicating how the point mode can be implemented, that is to say an operating mode in which rotating head 102 of rotating laser 100 is stationary and thus only one point is imaged on a boundary. For this purpose it is first necessary for button 16 to be pressed and, in accordance with the above statements, for laser head 102 to be brought to a stationary position. Once button 16 has been released, the button or control field 20 is pressed, in order to shift the point to the desired extent—as with the scan mode or the cross-sectional mode—i.e., once the threshold value is reached, the tilt, that is to say the tilt angle, of remote controller 10 is determined, in order to then shift the point toward the left or the right with a further tilt of housing 12, that is to say rotation around its longitudinal axis—clockwise or counterclockwise—specifically dependent upon the degree of tilt.

Using buttons 24, 32 or 36, 32, the laser unit can be shifted to the desired extent toward the original X- and Y-axes. To accomplish this, it is first necessary to press buttons 24 and 32 simultaneously for a shifting toward the X-axis. This activates the shift mode. Button 32 is then released, and with button 24 held down, a determination is made as to whether the tilt that is necessary for initiating the action has been reached or exceeded. The direction of the tilt is then determined—as described above—in order to then shift the X-axis dependent upon the tilt value. The same applies to the Y-axis, in which first buttons 26 and 32 are pressed, and once button 32 has been released, with button 26 held down, the desired shifting of the Y-axis is implemented.

Although the invention has been described based upon the "tilt" parameter of remote controller 10 or of housing 12 for the initiation of actions, which is understood as a synonym for operating modes, a different parameter may of course be used. A tilt in relation to vertical or a movement of housing 12 itself, that is to say the speed or acceleration thereof during movement or in different positions of housing 12 can likewise be used as the parameter in determining whether a selective change in the position or orientation of housing 12 has taken place, which is necessary in order to determine by means of the at least one sensor whether a threshold value has been reached, and then to initiate actions dependent upon the change in the parameter, as described above.

What is claimed is:

1. A method for operating a construction laser, such as a rotating laser or linear laser having a laser head, by means of a remote controller, which has at least one input field, such as a button, for initiating at least one action of the construction laser, wherein the remote control unit contains at least one sensor for determining a change in a parameter of the remote control unit, and the change in the parameter at least influences the at least one action, wherein the parameter is a parameter from the group comprising position, tilt, and movement of the remote control unit, and the action is at least one action or one operating mode from the group comprising rotational speed of the laser head, cross-sectional mode, mask mode, scan mode, tilt of the plane spanned by the particularly rotating laser beam, and point mode, characterized in that,
following activation of the at least one input field, the at least one action is initiated only when the degree of change in the at least one parameter of the remote control unit has at least reached a threshold value.

2. The method according to claim 1,
characterized in that,
once the threshold value has been reached, the degree of the at least one action is changed particularly proportionally, dependent upon the degree of change in the parameter.

3. The method according to claim 1,
characterized in that
the initiation of an action is dependent at least upon one other action implemented prior to said action, wherein the threshold value must be reached separately for each action.

4. The method according to claim 1,
characterized in that
a change in the degree of the at least one action is made only when the control field assigned to the action remains activated.

5. The method according to claim 1,
characterized in that
the tilt of the remote control unit or the housing thereof around its longitudinal axis and/or transverse axis is selected as the parameter.

6. The method according to claim 1,
characterized in that,
once the desired degree of the action has been reached, the input field is no longer activated, and the degree of the action initiated by the degree of the change in the parameter is maintained, in particular the rotational speed of the laser head.

7. The method according to claim 1,
characterized in that,
once an action has been initiated and maintained, when the control field assigned to said action is reactivated the degree of the action is changed immediately if the remote control unit is already in a position in which the parameter has exceeded the threshold value.

8. The method according to claim 1,
characterized in that,
to initiate the scan mode by activating a control field assigned thereto, an action is first carried out by means of which a laser beam emission that can be perceived outside of the rotating laser is carried out over an angle which is dependent on the degree of change in the parameter.

9. The method according to claim 1,
characterized in that
by activating a control field assigned to the action rotational speed of the laser head, and then reaching the threshold value, the speed of the rotating laser head is changed dependent upon the degree of change in the parameter.

10. The method according to claim 9,
characterized in that
to initiate the point mode, first the action that determines the speed of the laser head is implemented such that the laser head is stationary, and then by activating the control field assigned to the point mode and reaching the threshold value, the rotational position of the laser head is changed dependent upon the degree of change in the parameter.

11. The method according to claim 1,
characterized in that
to use the cross-sectional mode, in which an angular region of emitted light which is perceptible from outside the rotating laser is masked, a control field assigned to the cross-sectional mode is activated, and once the threshold value has been reached, the extent of the masked region is changed dependent upon the degree of change in the parameter.

12. The method according to claim 1,
characterized in that
the threshold value is an absolute value and is defined particularly by tilting the plane spanned by the remote control unit or the housing thereof in relation to the earth's gravitational field.

13. A method for operating a construction laser, such as a rotating or linear laser, by means of a remote control unit, which comprises at least one input field, such as a button, for initiating at least one action of the construction laser, wherein the remote control unit contains at least one sensor for determining a change in a parameter of the remote control unit, and the change in the parameter at least influences the at least one action, wherein the parameter is a parameter from the group comprising position, tilt, and movement of the remote control unit and the action is at least one action or one operating mode from the group comprising rotational speed of the laser head, cross-sectional mode, mask mode, scan mode, tilt of the plane spanned by the particularly rotating laser beam, and point mode,
characterized in that,
following activation of the at least one input field, and while the input field remains activated, the at least one action is initiated only when the degree of change in the at least one parameter of the remote control unit has at least reached a threshold value,
in that once the threshold value has been reached, the degree of the at least one action is changed dependent upon the degree of the change in the parameter that has taken place,
and in that, once the desired degree of the action has been reached, the input field is no longer activated, and the degree of the action initiated by the degree of the change is maintained, in particular the rotational speed of the laser head.

\* \* \* \* \*